United States Patent
Huang et al.

(10) Patent No.: US 9,747,234 B2
(45) Date of Patent: Aug. 29, 2017

(54) SOLID STATE DRIVE CONTROLLING CIRCUIT AND RELATED SOLID STATE DRIVE DEVICE AND SOLID STATE DRIVE ACCESS SYSTEM

(71) Applicant: Realtek Semiconductor Corp., Hsinchu (TW)

(72) Inventors: I-Hsun Huang, Chiayi (TW); Cheng-Yu Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 189 days.

(21) Appl. No.: 14/704,129

(22) Filed: May 5, 2015

(65) Prior Publication Data

US 2015/0324308 A1    Nov. 12, 2015

(30) Foreign Application Priority Data

May 6, 2014  (TW) .............................. 103116108 A

(51) Int. Cl.
| | |
|---|---|
| *G06F 13/36* | (2006.01) |
| *G06F 13/20* | (2006.01) |
| *G06F 13/38* | (2006.01) |
| *G06F 3/06* | (2006.01) |

(52) U.S. Cl.
CPC ............ *G06F 13/385* (2013.01); *G06F 3/061* (2013.01); *G06F 3/0659* (2013.01); *G06F 3/0679* (2013.01)

(58) Field of Classification Search
CPC .... G06F 3/061; G06F 12/0246; G06F 3/0659; G06F 3/0688; G06F 11/1068; G06F 3/0619; G06F 3/0679; G06F 3/0655; G06F 2213/0026

USPC .................................................. 710/308, 313
See application file for complete search history.

(56) References Cited

U.S. PATENT DOCUMENTS

| | | | |
|---|---|---|---|
| 2004/0019709 A1 | 1/2004 | Bissessur et al. | |
| 2009/0327588 A1* | 12/2009 | Sutardja ................ | G06F 3/0658 711/103 |
| 2010/0077117 A1* | 3/2010 | Asnaashari ........... | G06F 13/385 710/74 |
| 2012/0311197 A1* | 12/2012 | Larson ..................... | G11C 7/10 710/22 |
| 2013/0007332 A1* | 1/2013 | Teh ........................ | G06F 13/385 710/313 |

(Continued)

FOREIGN PATENT DOCUMENTS

CN         102160044 A     8/2011

*Primary Examiner* — Faisal M Zaman
(74) *Attorney, Agent, or Firm* — Birch, Stewart, Kolasch & Birch, LLP

(57) ABSTRACT

A solid state drive (SSD) controlling circuit and related SSD device and SSD access system are disclosed. The SSD controlling circuit includes: an AHCI (advance host controller interface) controlling circuit for coupling with a PCIe (peripheral component interconnect express) interface; and a flash memory controlling circuit coupled with the AHCI controlling circuit and configured to operably control accessing operations of one or multiple flash memory arrays of a solid state drive. The AHCI controlling circuit transmits an indication message to a host device through the PCIe interface. The indication message is configured to declare that the AHCI controlling circuit is currently coupled with M solid state drives, wherein M is an integer greater than 1 and less than 32.

11 Claims, 2 Drawing Sheets

(56) References Cited

U.S. PATENT DOCUMENTS

| | | | | |
|---|---|---|---|---|
| 2013/0332634 A1* | 12/2013 | Glaser | ............... | G06F 13/4286 |
| | | | | 710/104 |
| 2014/0047286 A1* | 2/2014 | Lee | ............... | G11C 29/10 |
| | | | | 714/719 |
| 2014/0149607 A1* | 5/2014 | Shim | ............... | G06F 3/0659 |
| | | | | 710/5 |
| 2014/0337540 A1* | 11/2014 | Johnson | ............... | G06F 13/385 |
| | | | | 710/5 |
| 2015/0324308 A1* | 11/2015 | Huang | ............... | G06F 13/28 |
| | | | | 710/308 |

* cited by examiner

SOLID STATE DRIVE CONTROLLING CIRCUIT AND RELATED SOLID STATE DRIVE DEVICE AND SOLID STATE DRIVE ACCESS SYSTEM

CROSS-REFERENCE TO RELATED APPLICATIONS

This application claims the benefit of priority to Patent Application No. 103116108, filed in Taiwan on May 6, 2014; the entirety of which is incorporated herein by reference for all purposes.

BACKGROUND

The disclosure generally relates to SSD (solid state drive) technologies and, more particularly, to a SSD controlling circuit and related SSD device and SSD access system.

Conventional SSD is typically designed to communicate data with a host device through a SATA (Serial Advanced Technology Attachment) interface. However, the transmission bandwidth of the SATA interface is restricted. As the accessing speed of the flash memory chips in the SSD increases, the SATA interface has gradually become a bottleneck for further improving the speed of data transmission between the SSD and the host device.

SUMMARY

In view of the foregoing, it may be appreciated that a substantial need exists for methods and apparatuses that mitigate or reduce the problems above.

An example embodiment of a SSD access system is disclosed, comprising: a host device and a SSD device. The host device comprises: a host-end communication circuit; and a processing circuit, coupled with the host-end communication circuit, configured to operably control operations of the host-end communication circuit. The SSD device comprises: a PCIe interface, configured to operably communicate data with the host-end communication circuit; a SSD; and a SSD controlling circuit. The SSD controlling circuit comprises: an AHCI control circuit, coupled with the PCIe interface; and a flash memory control circuit, coupled with the AHCI control circuit and for coupling with the SSD, wherein the flash memory control circuit is configured to operably control accessing operations of one or multiple flash memory arrays in the SSD; wherein the AHCI control circuit transmits an indication message to the processing circuit through the PCIe interface and the host-end communication circuit, and the indication message is configured to declare that the AHCI control circuit is currently coupled with M SSDs, wherein M is an integer greater than 1 and less than 32.

Another example embodiment of a SSD controlling circuit for use in a SSD access system is disclosed. The SSD access system comprises a host device and a SSD device. The host device comprises a host-end communication circuit and a processing circuit coupled with the host-end communication circuit. The SSD device comprises a PCIe interface, a SSD, and the SSD controlling circuit. The SSD controlling circuit comprises: an AHCI control circuit, coupled with the PCIe interface; and a flash memory control circuit, coupled with the AHCI control circuit and for coupling with the SSD, wherein the flash memory control circuit is configured to operably control accessing operations of one or multiple flash memory arrays in the SSD; wherein the AHCI control circuit transmits an indication message to the processing circuit through the PCIe interface and the host-end communication circuit, and the indication message is configured to declare that the AHCI control circuit is currently coupled with M SSDs, wherein M is an integer greater than 1 and less than 32.

Another example embodiment of a SSD device for use in a SSD access system is disclosed. The SSD access system comprises a host device and the SSD device. The host device comprises a host-end communication circuit and a processing circuit coupled with the host-end communication circuit. The SSD device comprises: a PCIe interface, configured to operably communicate data with the host-end communication circuit; a SSD; and a SSD controlling circuit. The SSD controlling circuit comprises: an AHCI control circuit, coupled with the PCIe interface; and a flash memory control circuit, coupled with the AHCI control circuit and for coupling with the SSD, wherein the flash memory control circuit is configured to operably control accessing operations of one or multiple flash memory arrays in the SSD; wherein the AHCI control circuit transmits an indication message to the processing circuit through the PCIe interface and the host-end communication circuit, and the indication message is configured to declare that the AHCI control circuit is currently coupled with M SSDs, wherein M is an integer greater than 1 and less than 32.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
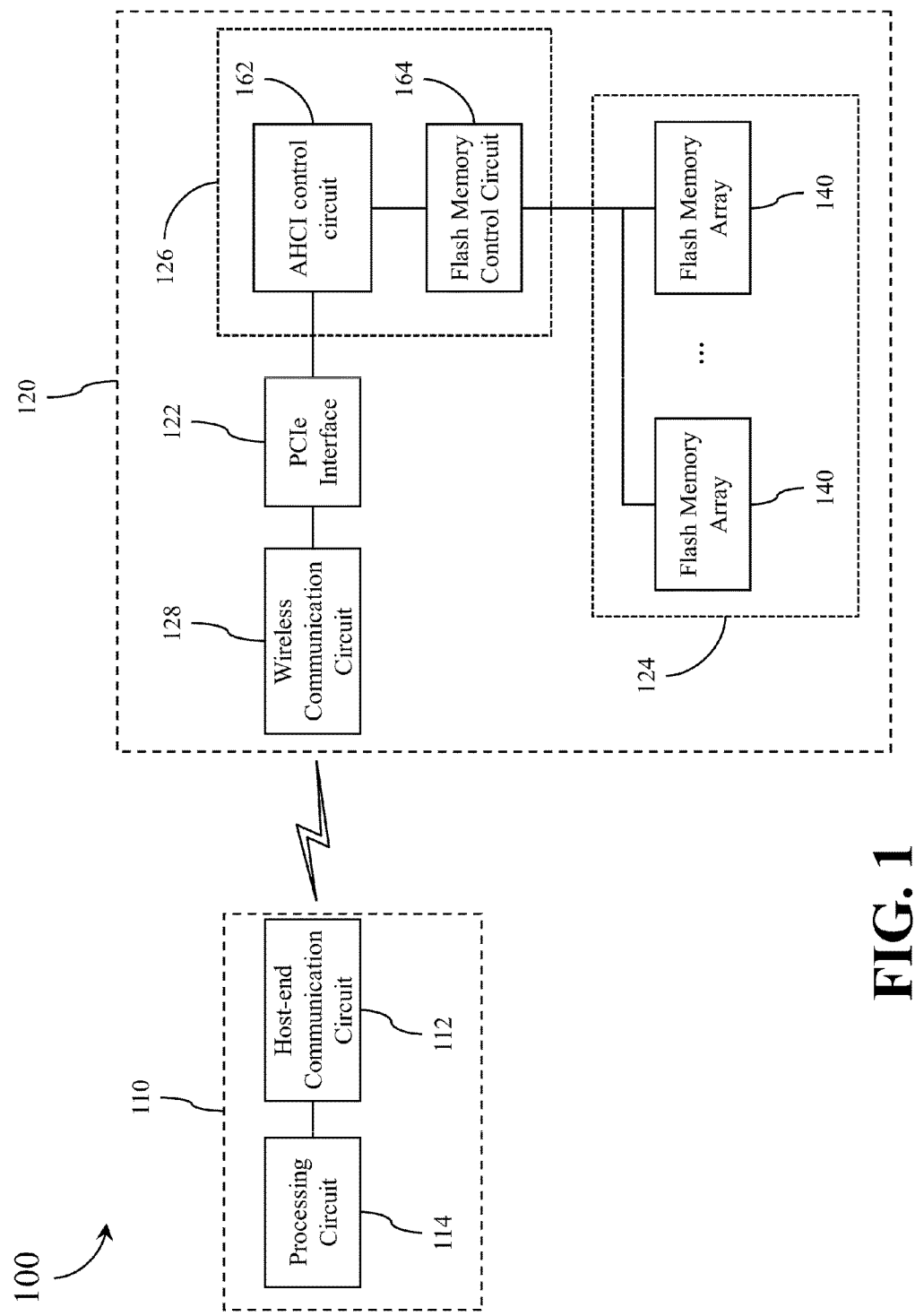
FIG. 1 shows a simplified functional block diagram of a SSD access system according to one embodiment of the present disclosure.

FIG. 1 shows a simplified functional block diagram of a SSD access system 100 according to one embodiment of the present disclosure. The SSD access system 100 comprises a host device 110 and a SSD device 120.

In the embodiment of FIG. 1, the host device 110 comprises a host-end communication circuit 112 and a processing circuit 114. The SSD device 120 comprises a PCIe (peripheral component interconnect express) interface 122, a SSD 124, a SSD controlling circuit 126, and a wireless communication circuit 128.

In the host device 110, the processing circuit 114 is coupled with the host-end communication circuit 112 and configured to operably control the operations of the host-end communication circuit 112 and other components (not shown) in the host device 110. In practice, the host device 110 may be any device capable of running various operating systems, such as a personal computer, a notebook computer, a tablet computer, a net-book computer, a smart phone, a smart TV, or the like.

In the SSD device 120, the PCIe interface 122 is configured to operably communicate data with the host-end communication circuit 112. As shown in FIG. 1, the SSD 124 comprises one or multiple flash memory arrays 140. The SSD controlling circuit 126 comprises an AHCI (advance host controller interface) control circuit 162 and a flash memory control circuit 164. The AHCI control circuit 162 is coupled with the PCIe interface 122 and configured to operably communicate data with the host device 110 through the PCIe interface 122. The flash memory control circuit 164 is coupled with the AHCI control circuit 162 and utilized for coupling with the SSD 124 of the SSD device 120. The flash memory control circuit 164 is configured to operably control the accessing operations of one of multiple flash memory arrays 140 in the SSD device 120. The wireless communication circuit 128 is coupled with the PCIe interface 122 and configured to operably conduct data communication between the host-end communication circuit 112 and the PCIe interface 122 through wireless transmission.

That is, in the embodiment of FIG. 1, the host-end communication circuit 112 is realized with a circuitry having wireless communication capability.

For simplicity of illustration, other components in the host device 110 and the SSD device 120 and their connection relationship, operations, and implementations are not shown in FIG. 1.

In a conventional SSD access system, the SSD and the host device communicate data with each other through a SATA interface. In the aforementioned SSD access system 100, however, the PCIe interface 122 acts as a data communication bridge between the SSD 124 and the host device 110 to thereby increase the data transmission bandwidth between the SSD 124 and the host device 110. As a result, the data transmission speed between the SSD 124 and the host device 110 could be greatly increased. This structural difference is one of the major differences between the SSD access system 100 and the conventional SSD access system.

Additionally, the AHCI control circuit of the conventional SSD access system is arranged within the host device. In the aforementioned SSD access system 100, however, the AHCI control circuit 162 is instead arranged within the SSD device 120 to thereby increase the design flexibility of the operation of the SSD device 120. Such structural difference is another one of the major differences between the SSD access system 100 and the conventional SSD access system.

Furthermore, when the AHCI control circuit of the conventional SSD access system is coupled with K SSDs, the AHCI control circuit transmits an indication message which represents that the AHCI control circuit is coupled with K SSDs to the processing circuit of the host device. Under this situation, the processing circuit of the host device assigns a corresponding number of command slots to the AHCI control circuit based on the indication message generated by the AHCI control circuit. For example, in the conventional SSD access system, when the AHCI control circuit is coupled with a single SSD, the AHCI control circuit transmits an indication message representing that the AHCI control circuit is coupled with a single SSD to the processing circuit, and the processing circuit assigns 32 command slots to the AHCI control circuit based on the indication message. In another example, when the AHCI control circuit is coupled with two SSDs, the AHCI control circuit transmits an indication message representing that the AHCI control circuit is coupled with two SSDs to the processing circuit, and the processing circuit assigns 64 command slots to the AHCI control circuit based on the indication message. In yet another example, when the AHCI control circuit is coupled with three SSDs, the AHCI control circuit transmits an indication message representing that the AHCI control circuit is coupled with three SSDs to the processing circuit, and the processing circuit assigns 96 command slots to the AHCI control circuit based on the indication message.

In the conventional SSD access system, the AHCI control circuit can only assign 32 command slots to each single coupled SSD. Accordingly, when a queue of the operating system executed by the processing circuit of the host device wants to access a particular SSD coupled with the AHCI control circuit, the processing circuit has to place an access command in a corresponding command slot. If the 32 command slots corresponding to the particular SSD are all busy, the processing circuit suspends the queue until one of the 32 command slots corresponding to the particular SSD is released by the operating system.

However, in the aforementioned SSD access system 100, when the flash memory control circuit 164 is coupled with a single SSD 124, the AHCI control circuit 162 transmits an indication message to the processing circuit 114 through the PCIe interface 122, the wireless communication circuit 128, and the host-end communication circuit 112. The indication message is configured to declare that the AHCI control circuit 162 is coupled with M SSDs, wherein M is an integer greater than 1 and less than 32.

Obviously, a total number of coupled solid state drives that the AHCI control circuit 162 declares to the processing circuit 114 would be greater than the actual number of solid state drives currently coupled with the AHCI control circuit 162 or the flash memory control circuit 164. This is a major operational difference between the AHCI control circuit 162 in the SSD access system 100 and the conventional AHCI control circuit.

Accordingly, the processing circuit 114 of the host device 110 would assign much more command slots to the AHCI control circuit 162 based on the indication message generated by the AHCI control circuit 162. As a result, the AHCI control circuit 162 is allowed to assign more than 32 command slots to the SSD 124 coupled with the flash memory control circuit 164.

For example, when M is configured to be 2, the AHCI control circuit 162 is allowed to assign 64 command slots to the SSD 124 coupled with the flash memory control circuit 164.

In another embodiment, M is configured to be greater than or equal to 3. In this situation, the AHCI control circuit 162 is allowed to assign 96 or even more command slots to the SSD 124 coupled with the flash memory control circuit 164.

In comparison with the conventional SSD access system, the number of command slots could be assigned by the aforementioned AHCI control circuit 162 to the SSD 124 coupled with the flash memory control circuit 164 is at least two times of that of the conventional AHCI control circuit. In this way, the operating system executed by the processing circuit 114 of the host device 110 is enabled to permit more queues to simultaneously access the SSD 124 coupled with the flash memory control circuit 164, thereby significantly increasing the data transmission speed between the SSD device 120 and the host device 110.

In operations, the flash memory control circuit 164 of the SSD controlling circuit 126 may group all the flash memory arrays 140 in the coupled SSD 124 into M virtual disk drives, and configure the M virtual disk drives to form a RAID (Redundant Array of Independent Disks) architecture for accessing. For example, in the embodiment where the aforementioned M is 2, the flash memory control circuit 164 may group all the flash memory arrays 140 in the SSD 124 into two virtual disk drives, and configure the two virtual disk drives to form a RAID 0 architecture or a RAID 1 architecture for accessing. In another embodiment where the aforementioned M is greater than or equal to 3, the flash memory control circuit 164 may group all the flash memory arrays 140 in the SSD 124 into three or more than three virtual disk drives, and configure those virtual disk drives to form a RAID 5 architecture for accessing.

As a result, a data error tolerance mechanism can be applied to the SSD 124 by utilizing the flash memory control circuit 164 to configure the SSD 124 to form a RAID architecture as elaborated previously, without installing additional ECC (error checking and correcting) circuits in the SSD 124. Such approach not only greatly increases the data reliability and application flexibility of the SSD device 120, but also reduces the hardware cost of the SSD device 120.

Figure 2:
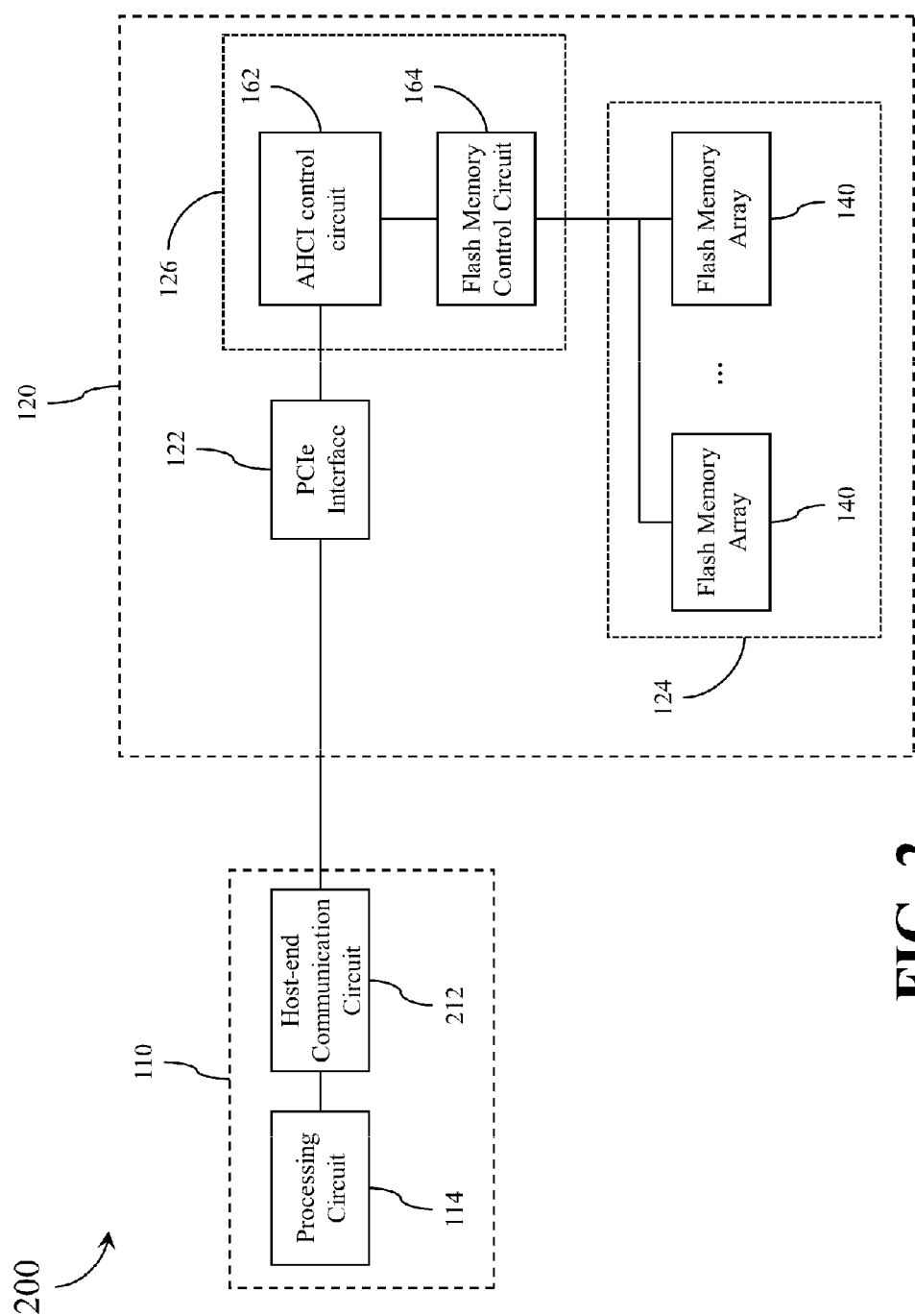
FIG. 2 shows a simplified functional block diagram of a SSD access system according to another embodiment of the present disclosure.

In the foregoing embodiments, the host-end communication circuit 112 is realized with a circuitry having wireless communication capability, but this is merely an example, rather than a restriction to the practical implementations. For example, FIG. 2 shows a simplified functional block diagram of a SSD access system 200 according to another embodiment of the present disclosure. The SSD access system 200 is similar to the aforementioned SSD access system 100. One difference between the two embodiments is that the SSD device 120 of the SSD access system 200 is directly coupled with the host-end communication circuit 112 through the PCIe interface 122, and the wireless communication circuit 128 is omitted to further simplify the hardware structure of the SSD device 120. In the embodiment of FIG. 2, the host-end communication circuit 112 may be realized with a conventional PCIe interface with no wireless communication capability.

The foregoing descriptions regarding the implementations, connections, and operations of other corresponding functional blocks in the SSD access system 100 are also applicable to the SSD access system 200. For the sake of brevity, those descriptions will not be repeated here.

It can be appreciated from the foregoing elaborations that the design flexibility of the operation of the SSD device 120 in the disclosed SSD access system 100 or 200 is increased since the AHCI control circuit 162 is arranged within the SSD device 120.

Another advantage of the disclosed SSD access system 100 or 200 is that the processing circuit 114 of the host device 110 is allowed to assign much more command slots to the AHCI control circuit 162 based on the indication message generated by the AHCI control circuit 162, and thus the AHCI control circuit 162 is enabled to assign more than 32 command slots to the SSD 124 coupled with the flash memory control circuit 164, thereby significantly increasing the data transmission speed between the SSD device 120 and the host device 110.

Another advantage of the disclosed SSD access system 100 or 200 is that a data error tolerance mechanism can be applied to the SSD 124 by utilizing the flash memory control circuit 164 to configure the SSD 124 to form the RAID architecture, without installing additional ECC circuits in the SSD 124. This approach not only greatly increases the data reliability and application flexibility of the SSD device 120, but also reduces the hardware cost of the SSD device 120.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A SSD access system, comprising:
a host device, comprising:
   a host-end communication circuit; and
   a processing circuit, coupled with the host-end communication circuit, configured to operably control operations of the host-end communication circuit; and
a SSD device, comprising:
   a PCIe interface, configured to operably communicate data with the host-end communication circuit;
   a SSD; and
   a SSD controlling circuit, comprising:
      an AHCI control circuit, coupled with the PCIe interface; and
      a flash memory control circuit, coupled with the AHCI control circuit and for coupling with the SSD, wherein the flash memory control circuit is configured to operably control accessing operations of one or multiple flash memory arrays in the SSD;
wherein the AHCI control circuit transmits an indication message to the processing circuit through the PCIe interface and the host-end communication circuit, and the indication message is configured to declare that the AHCI control circuit is currently coupled with M SSDs, wherein M is an integer greater than 1 and less than 32,
wherein a total number of coupled solid state drives that the AHCI control circuit declares to the processing circuit is greater than an actual number of solid state drives currently coupled with the flash memory control circuit, so as to render the processing circuit to assign additional command slots to the AHCI control circuit to thereby allow the AHCI control circuit to assign more than 32 command slots to the SSD coupled with the flash memory control circuit.

2. The SSD access system of claim 1, wherein the flash memory control circuit groups the multiple flash memory arrays in the SSD into M virtual disk drives, and configures the M virtual disk drives to form a RAID (Redundant Array of Independent Disks) architecture for accessing.

3. The SSD access system of claim 2, wherein M is greater than or equal to 3.

4. The SSD access system of claim 2, wherein the SSD device further comprises:

a wireless communication circuit, coupled with the PCIe interface, configured to operably conduct data communication between the host-end communication circuit and the PCIe interface through wireless transmission.

5. A SSD controlling circuit for use in a SSD access system, the SSD access system comprising a host device and a SSD device, wherein the host device comprises a host-end communication circuit and a processing circuit coupled with the host-end communication circuit, and the SSD device comprises a PCIe interface, a SSD, and the SSD controlling circuit, the SSD controlling circuit comprising:
   an AHCI control circuit, coupled with the PCIe interface; and
   a flash memory control circuit, coupled with the AHCI control circuit and for coupling with the SSD, wherein the flash memory control circuit is configured to operably control accessing operations of one or multiple flash memory arrays in the SSD;
   wherein the AHCI control circuit transmits an indication message to the processing circuit through the PCIe interface and the host-end communication circuit, and the indication message is configured to declare that the AHCI control circuit is currently coupled with M SSDs, wherein M is an integer greater than 1 and less than 32,
   wherein a total number of coupled solid state drives that the AHCI control circuit declares to the processing circuit is greater than an actual number of solid state drives currently coupled with the flash memory control circuit, so as to render the processing circuit to assign additional command slots to the AHCI control circuit to thereby allow the AHCI control circuit to assign more than 32 command slots to the SSD coupled with the flash memory control circuit.

6. The SSD controlling circuit of claim 5, wherein the flash memory control circuit groups the multiple flash memory arrays in the SSD into M virtual disk drives, and configures the M virtual disk drives to form a RAID architecture for accessing.

7. The SSD controlling circuit of claim 6, wherein M is greater than or equal to 3.

8. A SSD device for use in a SSD access system, the SSD access system comprising a host device and the SSD device, wherein the host device comprises a host-end communication circuit and a processing circuit coupled with the host-end communication circuit, the SSD device comprising:
   a PCIe interface, configured to operably communicate data with the host-end communication circuit;
   a SSD; and
   a SSD controlling circuit, comprising:
      an AHCI control circuit, coupled with the PCIe interface; and
      a flash memory control circuit, coupled with the AHCI control circuit and for coupling with the SSD, wherein the flash memory control circuit is configured to operably control accessing operations of one or multiple flash memory arrays in the SSD;
   wherein the AHCI control circuit transmits an indication message to the processing circuit through the PCIe interface and the host-end communication circuit, and the indication message is configured to declare that the AHCI control circuit is currently coupled with M SSDs, wherein M is an integer greater than 1 and less than 32,
   wherein a total number of coupled solid state drives that the AHCI control circuit declares to the processing circuit is greater than an actual number of solid state drives currently coupled with the flash memory control circuit, so as to render the processing circuit to assign additional command slots to the AHCI control circuit to thereby allow the AHCI control circuit to assign more than 32 command slots to the SSD coupled with the flash memory control circuit.

9. The SSD device of claim 8, wherein the flash memory control circuit groups the multiple flash memory arrays in the SSD into M virtual disk drives, and configures the M virtual disk drives to form a RAID architecture for accessing.

10. The SSD device of claim 9, wherein M is greater than or equal to 3.

11. The SSD device of claim 9, further comprising:
   a wireless communication circuit, coupled with the PCIe interface, configured to operably conduct data communication between the host-end communication circuit and the PCIe interface through wireless transmission.

* * * * *